United States Patent [19]
Carlsen et al.

[11] Patent Number: 5,515,427
[45] Date of Patent: May 7, 1996

[54] COMPLETION OF INTELLIGENT NETWORK TELEPHONE CALLS

[75] Inventors: Ralph Carlsen, Port Monmouth; James F. Day, Colts Neck, both of N.J.

[73] Assignee: AT&T Corp., Murray Hill, N.J.

[21] Appl. No.: 277,450

[22] Filed: Jul. 19, 1994

[51] Int. Cl.$^6$ .................................................. H04M 7/00
[52] U.S. Cl. ........................... 379/220; 379/201; 379/207
[58] Field of Search ...................................... 379/201, 207, 379/219, 220, 221, 91, 216, 211, 212, 243, 142, 93, 67, 58, 210

[56] References Cited

U.S. PATENT DOCUMENTS

| | | | |
|---|---|---|---|
| 4,191,860 | 3/1980 | Weber | 379/115 |
| 4,313,035 | 1/1982 | Jordan et al. | 379/207 |
| 4,800,582 | 1/1989 | D'Agosto, III et al. | 379/216 |
| 5,243,645 | 9/1993 | Bissell et al. | 379/211 |
| 5,271,058 | 12/1993 | Andrews et al. | 379/210 |
| 5,311,572 | 5/1994 | Friedes et al. | 379/67 |
| 5,335,404 | 10/1994 | LeDuc et al. | 379/201 |
| 5,353,331 | 10/1994 | Emery et al. | 379/58 |

OTHER PUBLICATIONS

Special Report SR-NPL-001623, issued by Bellcore in Jun. 1990 entitled "Advanced Intelligent Network Release 1 Network and Operations Plan".
R Ostler et al. "PCS Hands-On Communications for All", *Telephony*, Feb. 26, 1994, pp. 31-42.
Q.1200 Series of Recommendations, International Telecommunications Union Telecommunications Standards Sector (ITU-TSS, formerly CCITT).
H. W. Kettler, et al. "AT&T's Global Intelligent Network Architecture" *AT&T Technical Journal*, Sep./Oct. 1992, pp. 30-35.

*Primary Examiner*—Jeffery Hofsass
*Assistant Examiner*—Scott Wolinsky
*Attorney, Agent, or Firm*—Barry H. Freedman; Stephen M. Gurey

[57] ABSTRACT

Intelligent network telephone calls are processed by an intelligent terminal which cooperates with network elements such as a database that contains information with respect to such calls. When a call requiring intelligent network treatment is first made from an intelligent terminal, if the terminal does not have the requisite information to complete the call, the call is processed by network elements such as an originating switch and a network database which attempt to find routing information for the call. However, if the call contains an indication that (a) the calling party requests a down load, and the database record associated with the dialed number indicates that routing information stored in the database is marked for down loading, then the routing information is down loaded and stored in the intelligent terminal. When a subsequent call to the same number and therefore requiring the same treatment is again made, the intelligent terminal now contains the requisite routing information needed to complete the call. In this circumstance, the call does not have to be processed by intelligent network elements such as the network database. The routing information can be a destination number, or an indication of the particular network (e.g. wireline, cellular or CATV) that will carry the call, or other similar information.

21 Claims, 5 Drawing Sheets

FIG. 4

| DIALED NUMBER (401) | DESTINATION NUMBER (402) |
|---|---|
| 1+800+NXX-XXXX | 1+NPA+NXX-XXXX |
| 1+900+123-4567 | 1+201+987-6543 |
| | |
| ⋮ | ⋮ |

FIG. 5

| DIALED NUMBER (501) | TIME OF DAY (503) | DESTINATION NUMBER (502) | DOWN LOAD ? (504) |
|---|---|---|---|
| 1+800+NXX-XXXX | ALL | 1+NPA+NXX-XXXX | YES |
| 1+800+123-4567 | 0→7 | 1+NPA+NXX-YYYY | NO |
| | 7→18 | 1+NPA+NXX-WWWW | NO |
| | 18→24 | 1+NPA+NXX-ZZZZ | NO |
| 1+900+123-4567 | ALL | 1+201+987-6543 | YES |
| ⋮ | ⋮ | ⋮ | ⋮ |

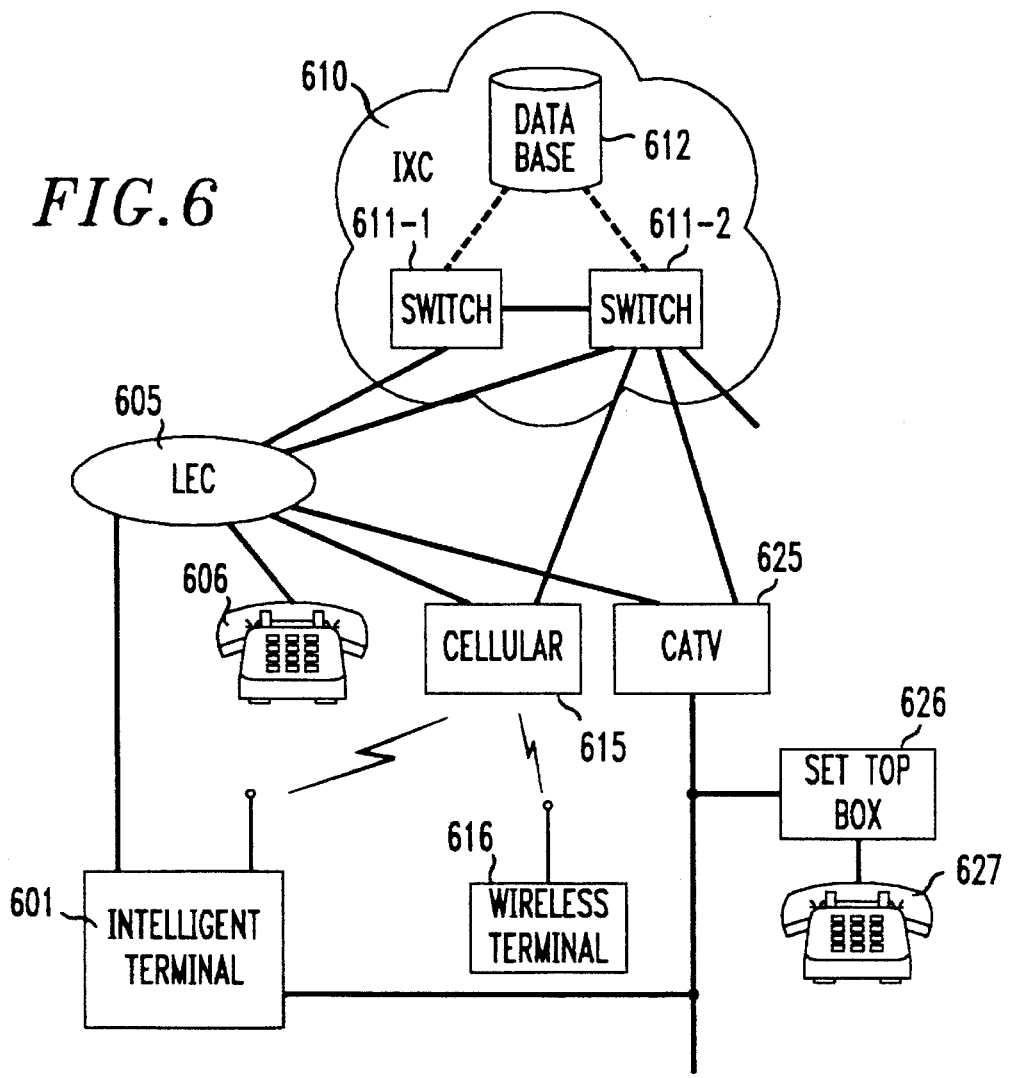

COMPLETION OF INTELLIGENT NETWORK TELEPHONE CALLS

TECHNICAL FIELD

This invention relates generally to apparatus and method for completing intelligent network telephone calls, i.e., calls that normally require the retrieval of stored information from a network database in order to route or process the call, and, in particular, to completion of such telephone calls through cooperation between the intelligent network and an intelligent terminal, i.e., a terminal that has the capability to store information and to perform logical operations using such information.

BACKGROUND OF THE INVENTION

Intelligent network telephone call processing is now quite common. For example, when an "800" or "toll free" number is dialed, the call can be routed to a regular telephone number, and the charge for that call is billed to the called number. In order to process the call, a database is queried to determine or define the actual destination for the call. Routing or other handling of the call can thus can involve not only the dialed number, but also various other factors, such as the location where the call originated, information indicating the history of the caller, the day of the week or the time of day that the call is being made, and so on. An example of network based intelligent call routing is contained in U.S. Pat. No. 4,191,860 issued to R. P. Weber on Mar. 4, 1980. Many details of the intelligent network and the features offered in it are set forth in special Report SR-NPL-001623, issued by Bellcore in June 1990 and entitled "Advanced Intelligent Network Release 1 Network and Operations Plan". Other information relating to the intelligent network may be found in the Q.1200 series of recommendations prepared by the International Telecommunications Union Telecommunications Standards Sector (ITU-TSS, formerly known as CCITT), and in an article entitled "AT&T's Global Intelligent Network Architecture" by Kettler et al. in the AT&T Technical Journal, September/October 1992, at page 30.

SUMMARY OF THE INVENTION

We have found that the process of repeatedly accessing a network database or other similar network-based storage element to determine the routing or other handling of intelligent network telephone calls can be inefficient and time consuming. In accordance with the present invention, intelligent network telephone calls are processed by an intelligent terminal which cooperates with network elements such as the database that contains information with respect to such calls. When a call requiring intelligent network treatment is first made from an intelligent terminal, the terminal does not have the requisite information to complete the call; in this circumstance, the call is processed by network elements such as the originating switch and/or the network database to determine a destination number (or other information used for routing purposes) associated with the dialed number. However, if the call contains an indication that (a) the calling party requests a down load, and (b) the database record associated with the dialed number indicates that the destination number stored in the database is marked for down loading, then the destination number is down loaded and stored in the intelligent terminal. (As used hereinafter, "destination number" includes any type of information associated with a particular dialed number that can be used to route or complete calls placed to that dialed number.)

When a subsequent call is made to the same dialed number (and therefore would require the same treatment), the intelligent terminal now contains the requisite destination number needed to complete the call. In this circumstance, the call does not have to be processed by network elements such as the network database to find a destination number associated with the dialed number. As a result, the speed and efficiency of call setup and processing is increased.

In one specific embodiment of the invention, the intelligent terminal includes a memory for storing translations between dialed 800 telephone numbers and routing numbers that correspond to those dialed numbers. When an 800 call is made, the digits of the dialed number are collected and compared, illustratively on a digit by digit basis, to the numbers in the memory. If no match is found, the dialed number is transmitted to the originating switch, and a query message is send from that switch to a service control point (SCP). The SCP translates the 800 number to the appropriate destination number, which is returned to the originating switch, so that the call can be routed to the proper destination. The originating switch also transmits the destination number to the intelligent terminal, for storage in the memory in association with the dialed 800 number. When the same 800 number is subsequently called, the dialed number can now be located in the memory. The associated destination number is retrieved and sent to the originating switch, which routes the call. In this situation, a query to the SCP is not necessary, and call setup time is accordingly advantageously reduced.

It is noted that in this embodiment of the invention, a call subsequently placed to an 800 number from an intelligent terminal will lose its "toll free" status, since the call will be made using an ordinary (non-toll free) destination or routing number. This, however, may be an acceptable trade-off, considering, for example, the advantage of faster call set-up time and the ability to place such calls over the network preferred by the calling party.

In another embodiment of the invention, an intelligent terminal is capable of routing an outbound call over several diverse types of networks, such as a cable television network and a cellular telephone network, in addition to the ordinary telephone network. When a call is first made from the intelligent terminal to a particular number, the call is routed in accordance with a default routing scheme, and routing information is obtained from a database in the default network and returned to and stored in the intelligent terminal. When a call to the same number is next made from that intelligent terminal, the call may be routed over a different type of network.

BRIEF DESCRIPTION OF THE DRAWING

The present invention will be more fully appreciated by consideration of the following Detailed Description, which should be read in light of the accompanying drawing in which:

FIGS. 4 and 5 illustrate the format of records contained in memory 108 within intelligent terminal 101 of FIG. 1, and in database 112 within network 110 of FIG. 1, respectively;

FIG. 6 is a block diagram illustrating the overall arrangement of another embodiment of the present invention, in which calls originated from an intelligent terminal may be routed over diverse types of networks, and FIG. 7 illustrates the format of records contained in the number translation memory within intelligent terminal 601 of FIG. 6 as well as in database 612 of FIG. 6.

DETAILED DESCRIPTION

Figure 1:
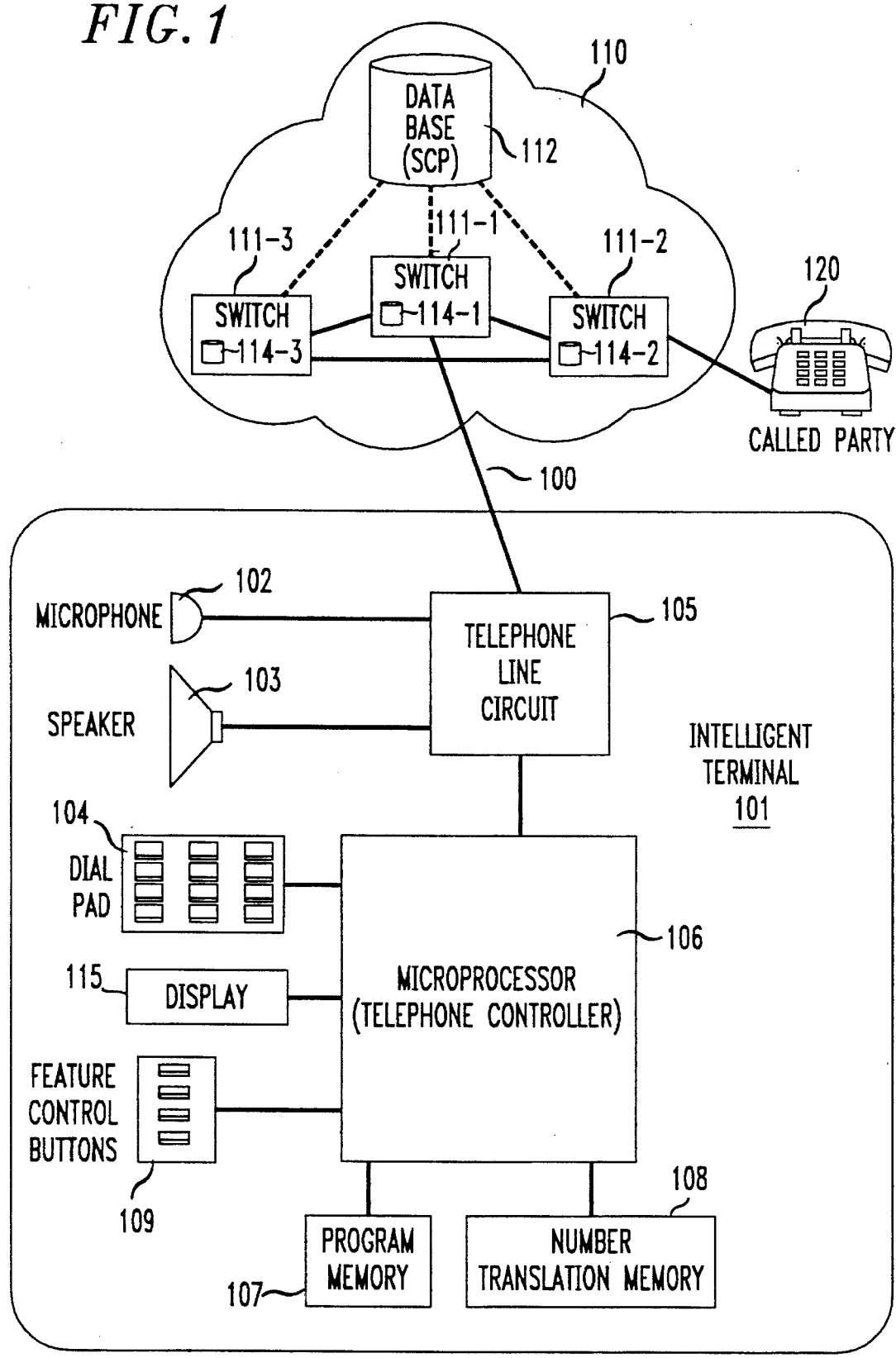
FIG. 1 is a block diagram illustrating the overall arrangement of a system by which an intelligent terminal cooperates with elements in an intelligent telecommunications network in order to route intelligent network telephone calls.

Referring first to FIG. 1, there is shown a block diagram illustrating the overall arrangement of a system by which an intelligent terminal 101 cooperates with elements in an intelligent telecommunications network designated generally as network 110, in order to route intelligent network telephone calls. Network 110 includes several interconnected switches 111-1, 111-2 and 111-3 which are each served by a common, centralized database 112. Switches 111-1, 111-2 and 111-3 may each include an internal cache memory 114-1, 114-2 and 114-3, respectively. Terminal 101 is connected to switch 111-1 via a local loop 100, so that switch 111-1 is the "originating switch" when a call is initiated in terminal 101. A called party served by a station 120 is connected to another one of the switches, namely switch 111-2, which is the terminating switch when the call is directed to that station. Note that the elements of FIG. 1 are shown in greatly simplified form, for ease of explanation; accordingly other network elements normally associated with local and interexchange carriers are not separately shown.

In one specific arrangement of the present invention, switches 111 can each be a #5ESS electronic program controlled switching system available from AT&T, while database 112 can be a No. 2 Network Control Point (NCP) also available from AT&T. In subsequent portions of this specification, database 112 is referred to as a "Service Control Point" (SCP), since that is the most common term used by persons skilled in the art. Switches 111 and database 112 may be interconnected with each other by elements (such as signal transfer points, not shown) in a common channel signaling system, such as SS7 system, such that queries may be made by a switch 111 to database 112, and information retrieved in response to the queries may be returned to the switch, all in the form of data messages. Signaling paths are shown as dotted lines in FIG. 1.

Intelligent terminal 101 includes the normal components of a telephone station, such as a telephone line circuit 105, which couples terminal 101 to network 110 via local loop 100, and a microphone 102 and a speaker 103, connected to line circuit 105, which act as audio input and output devices, respectively. At the heart of terminal 101 is a microprocessor 106, which acts as a telephone controller and serves to interconnect the other various elements of the terminal. In particular, a dial pad 104 and its associated touch tone generator are connected to microprocessor 106, and are used to allow a user of the terminal to enter a dialed number. Feature control buttons 109, also connected to microprocessor 106, when actuated, signal the microprocessor to enable or disable selected processes or functionalities, which are described in more detail below. Terminal 101 also includes a number translation memory 108 that can store records of the type shown in FIG. 4 on a long term basis, and a program memory 107 that can store program instructions that control the operation of microprocessor 106, thereby enabling the various components of terminal 101 to perform the process described below in connection with FIG. 2. If desired, terminal 101 may include a display 115, such as an LCD display, which can present alphanumeric information to a user.

It is to be noted here that the components illustrated in FIG. 1 are functional in nature, and that persons skilled in the art will recognize that the same functions can be performed by various kinds of hardware. Some comments will illustrate this point. First, it will be recognized that the functions performed in program memory 107 and number translation memory 108 can be combined, and that this memory can be a RAM chip, any other type of semiconductor memory, or any other memory means that is capable of storing information and being queried to permit retrieval of such information. Second, it will be recognized that the intelligent terminal can be implemented in a personal computer equipped with an appropriate telephone interface board. In such an implementation, the telephone interface board provides the functions of telephone line circuit 105, dial pad 104 and its associated touch tone generator, microphone 102 and speaker 103, and the conventional components of the computer itself provide the functions of microprocessor 106, display 115, feature control buttons 109, number translation memory 108 and program memory 107.

Figure 2:
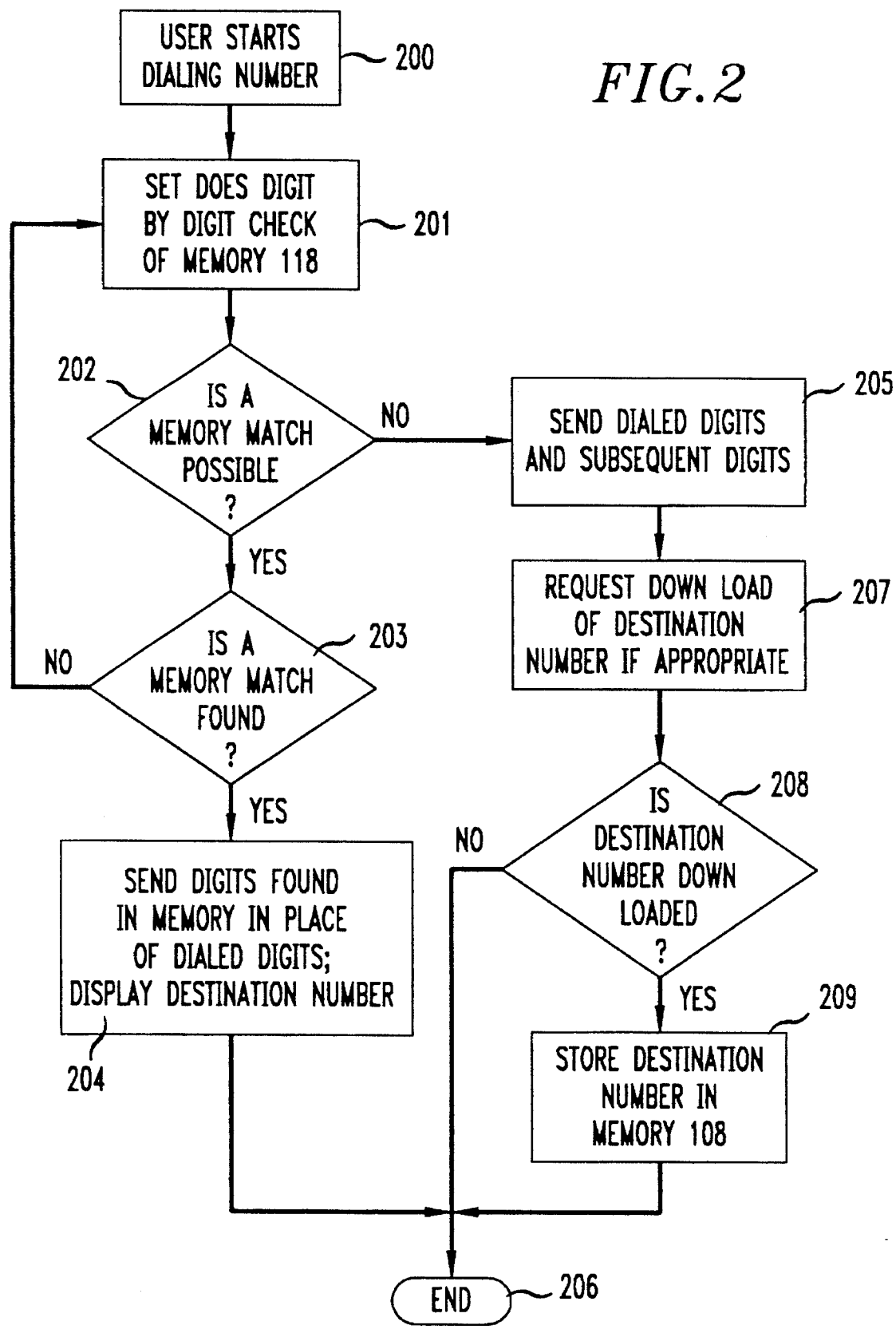
FIG. 2 illustrates the process performed in the intelligent terminal 101 of FIG. 1.

FIG. 2 illustrates the process, initiated in step 200 by the dialing of an outgoing telephone call, that is performed using the program instructions stored in program memory 107 in the intelligent terminal 101 of FIG. 1. In step 201, as each digit of the dialed number entered on key pad 104, it is examined in order to determine, in step 202, if the number (i.e., the sequence of digits) dialed thus far can possibly match one of the numbers stored in memory 108. (The reasons for performing this process on a digit by digit basis are set forth below.) If the result of step 202 is negative, it is concluded that the call cannot be processed with information stored in terminal 101. In this event, processing proceeds with step 205, wherein the already dialed digits as well as any subsequently dialed digits are transmitted to the originating switch 111-1. In addition to transmitting the dialed number, station 101 is arranged, in accordance with the invention, to request from switch 111-1, in step 207, the down loading of a destination number. This request may be made for all calls or, preferably, may be made only selectively. In the latter case, the request for down loading may be made by station 101 only if the dialed number is recognized as the type of number (e.g., the NPA of the dialed number indicates the call is a "500", "700", "800" or "900" call) that may have an associated destination number of a type that can be down loaded. Down loading may also be manually requested by the operation of one of the feature control buttons 109 if the caller suspects the network is using a database to route the call.

Depending upon the particular arrangement of the elements in network 110, switch 111-1 may, responsive to receipt of a dialed number recognized as a number requiring "intelligent call processing", launch a query, via the signaling network, to database 112, or query its own local cache memory 114-1, in order to retrieve a destination number that is associated with the dialed number. After the query is launched, the destination number corresponding to the dialed number may be ascertained and returned to switch 111-1, if there was an appropriate entry in database 112 or the cache memory associated with switch 111-1. This destination number is then used to route the call through the other elements in network 110 to the appropriate destination, such as station 120. At the same time, the database or cache memory indicates that the retrieved destination number is or is not "down loadable". (This is described in more detail in connection with step 303 in FIG. 3.) In either event, after a request to down load a destination number is made in step 207, a determination is made in step 208 as to whether a destination number was in fact returned to the station. If so, that number is stored in memory 108 of station 101 in step 209, and the process of FIG. 2 is terminated in step 206. If the result of step 208 is negative, the process of FIG. 2 is also terminated in step 206.

If the result of step 202 is positive, indicating that the dialed number may possibly match a stored number in memory 108, memory 108 is queried and a determination is next made in step 203 as to whether memory 108, in fact, contains an entry for the dialed number and the corresponding destination or routing number associated with that dialed number. If a negative result is obtained in step 203, the process of digit by digit checking performed in steps 201 and 202 is continued. As soon as it is determined that no match is possible (eventually, it may be determined that the entire dialed number is not stored in memory 108), the process beginning with step 205, already described, will occur.

On the other hand, if the determination made in step 203 is positive, indicating that the dialed number and its associated destination number are already stored in memory 108, then the associated destination number is sent to switch 111-1 in place of the dialed number, in step 204, and this number, rather than the dialed number, is used by that switch to complete the call. Note that since the destination number is now a "conventional" number rather than an intelligent network number, the call will be routed without the need for switch 111-1 to access its cache memory 114-1 or database 112 via the SS7 signaling network. If desired, the destination number can be displayed on display 115, to indicate to the caller that the call placed to the dialed number is actually being placed to a number different from the number dialed. If the caller wishes, he or she may hang up at this time and thereafter disable the present invention by activation of one of the feature control buttons 109. If this is done, the test in step 202 is forced to a negative result, whereby the dialed digits are used to complete the call.

As indicated above, the process of FIG. 2, in steps 201 and 202, performs a digit by digit check of memory 108 to determine if the dialed number is, in fact, a number for which a memory match is NOT possible. This arrangement is preferred over an implementation that collects and examines the entire dialed telephone number, because an earlier decision can be made in step 202, particularly if use of the present invention is limited to dialed numbers that begin with a preselected group of NPA's, such as toll free or "800" numbers and other special service numbers that have NPA's of 900, 700 or 500. After examination of only a few, i.e., three or four, digits, such as the "1" indicating a long distance call plus the three digits of the NPA, a determination can already be made that it is not necessary to further query memory 108 in step 203.

The process illustrated in FIG. 2 may be modified, if desired, to remove information from number translation memory 107 on a periodic or timed basis, so that there can be some reasonable assurance that the destination number associated with a particular dialed number is the "current" destination number. This aspect of the invention may be accomplished by associating a time stamp with each destination number stored in memory 107, indicating the date and/or time at which the information was stored. Then, in step 202 of FIG. 2, the time stamp can be checked to make sure that the difference between the current time and the time indicated by the time stamp is not too great. If a desired time is exceeded, the stored information is removed and/or ignored. As an alternative, the contents of memory 107 can be checked on a regular basis to remove "stale" information.

Figure 3:
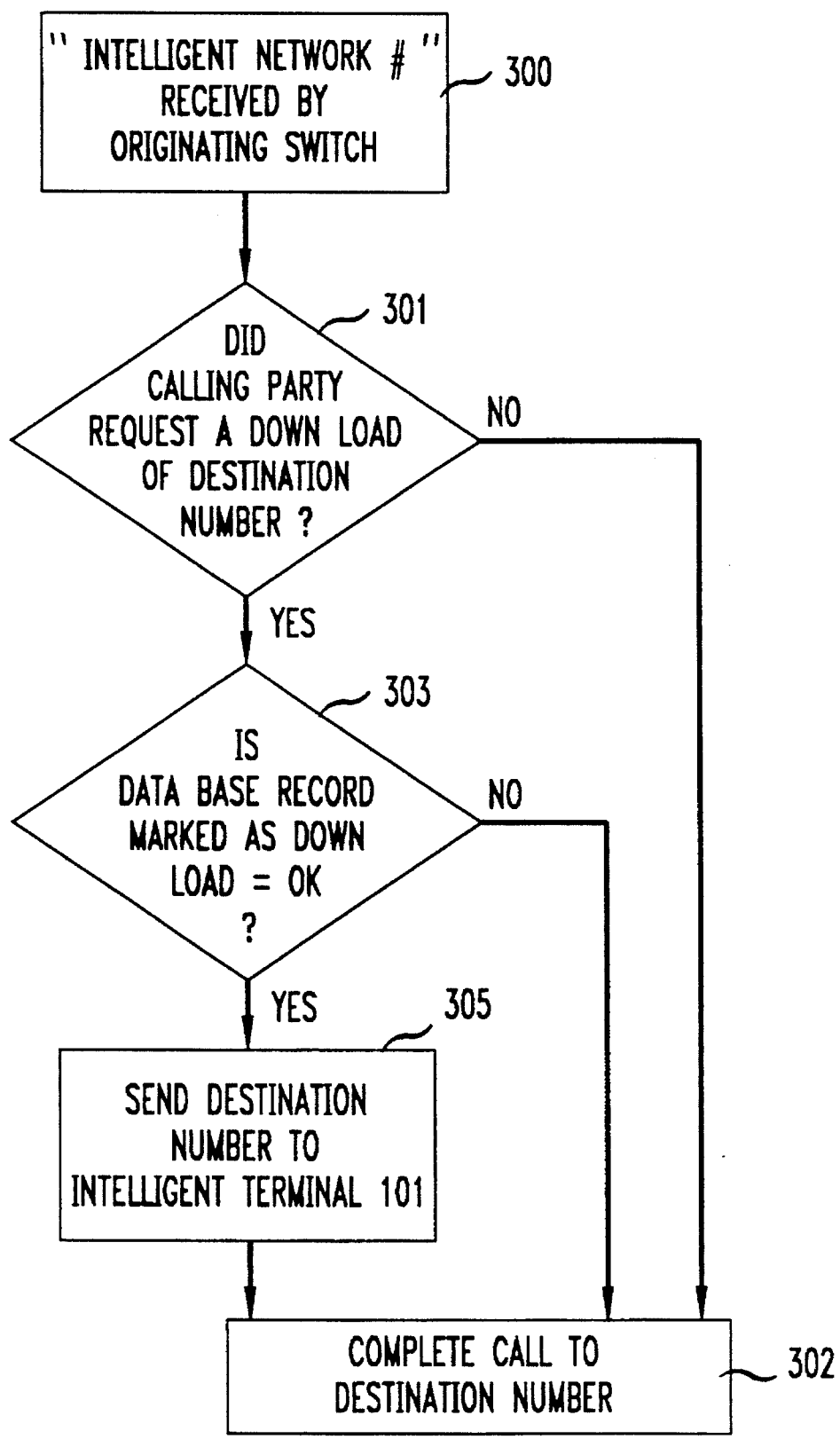
FIG. 3 illustrates the process performed in a switch in the intelligent network 110 of FIG. 1.

FIG. 3 illustrates the process performed in the originating switch, such as switch 111-1 in the intelligent network 110 of FIG. 1, in accordance with the present invention. As stated previously, depending upon the particular arrangement of the elements in network 110, switch 111-1 may be arranged to recognize a dialed number as a number requiring "intelligent call processing". In this type of implementation, calls that do not require "intelligent call processing" are treated conventionally, meaning that it is not necessary to launch a query to network database 112 or to query the local cache or other memory 114-1 associated with originating switch 111-1. In this category are calls that would otherwise require "intelligent call processing", but for which destination or routing numbers have already been stored in terminal 101. For these calls, as stated previously, the information found in memory 108, representing the destination number that is associated with the dialed telephone number, is sent to the originating switch in step 204 of FIG. 2, so that processing, from the point of view of switch 111-1, is no different from the processing that occurs when an ordinary call to that number is manually dialed by a caller.

The process of FIG. 3 is initiated in step 300, when a dialed number is received from a terminal such as intelligent terminal 101. In step 301, a determination is made as to whether the dialed number is a number that requires intelligent call processing, and whether the call is accompanied by a request for down loading, such as the request generated in step 207 of FIG. 2. If the result of the test performed in step 301 is negative, then the call is processed conventionally in step 302, using the dialed number information received from station 101. Note here that there will be no request for down loading (and the result of the test performed in step 301 will therefore be negative) when the destination number associated with the dialed number was already stored in memory 108, so that, in the process of FIG. 2, step 203 produced a positive result and the stored information was transmitted in place of the dialed digits in step 204. There will also be no request for down loading on intelligent network calls dialed from "dumb" telephones, i.e., ordinary telephones that do not have the processing capability or otherwise cannot or do not implement the intelligence of the present invention.

If the result of the test performed in step 301 is positive, then a determination is made in step 303 as to whether switch 111-1 has a destination number that can be down loaded. This decision can depend upon a number of factors that were alluded to above, in connection with the description of step 208 in FIG. 2. Several examples will illustrate: First, even though the dialed number may be a number that normally corresponds to a number involving an intelligent network telephone call, there may not be a corresponding destination number available in database 112 or in the cache memory 114 associated with the originating switch, or the destination number may be corrupted, obsolete or otherwise unavailable. Second, there may not be a single destination or routing number associated with a particular dialed number, but, rather, several destination numbers that are selected based upon some predetermined logical analysis. (In the latter event, an alternative implementation of the present invention may be used, as described more fully below.)

Third, the subscriber associated with certain intelligent network (e.g. 800 number) telephone calls may not wish to divulge the destination number associated with the dialed number.

If the result of the determination made in step 303 is negative, then down loading does not occur. Rather, the process continues with step 302, in which the call is completed in the conventional manner. On the other hand, if the result of the determination made in step 303 is positive, then the destination number associated with the dialed number is sent from switch 111-1 to terminal 101 in step 305, and stored in memory 108. The call is also, in this instance, then completed in the conventional manner, in step 302.

FIGS. 4 and 5 illustrate, respectively, the formats of records contained in memory 108 within terminal 101 of FIG. 1 and of records contained in database 112 in network 110, or in cache memory 114 in switches 111. In FIG. 4, field 401 contains various dialed numbers, and the remainder of each line contains information associated with the particular dialed number indicated in field 401. For each dialed number in field 401, field 402 contains an associated destination number that was provided by switch 111-1 in step 305 of FIG. 3 and stored in memory 108 in step 209 of FIG. 2. It will be seen from FIG. 5 that the records stored in database 112 may have a similar format, in that field 501 contains dialed telephone numbers and field 502 contains associated destination numbers. Certain dialed numbers are associated with multiple destination numbers, depending upon the time of day value entered in field 503. Thus, the entry corresponding to the dialed number 1-800-123-4567 contains a first destination number that applies to calls originated from 12:00 midnight until 7:00 A.M., a second destination number that applies to calls made from 7:00 A.M. to 6:00 P.M., and a third destination number that applies to calls made at other times. In the situation where one dialed number is associated with multiple destination numbers, the destination numbers may be considered to be "non-downloadable", and for this purpose, field 504 would contain a "NO" indicator representing that fact that particular destination number entries in database 112 cannot be down loaded. As an alternative, however, the present invention may be modified so that all of the destination numbers, as well as the logical rule (based upon criteria obtained from field 503) for choosing among those numbers, is down loaded to terminal 101 in response to the initial initiation of a telephone call to the dialed number associated with those destination numbers. In this event, terminal 101 must be arranged, in step 204, to both execute the logical rule and then to select the appropriate stored number, depending upon the outcome when the logical rule is applied at the time that the call is made. Otherwise, the down load will not be done.

From the foregoing description, it will be recognized that if the present invention is implemented in the context of toll-free (i.e., 800 number) calls, then calls made using destination numbers or other information in the intelligent terminals will no longer enjoy toll free status, since these calls will not be recognized by network elements as being directed to a toll free number. This, however, may be advantageous in several situations. First, the destination telephone number stored in the intelligent terminal may turn out to be a number that is within the local calling area of the origination station, so that there will be no additional charge imposed for such calls over the flat rate billing already imposed. Second, the present invention will allow more rapid redial of 800 (or any other intelligent telephone) numbers, which would be very important in the context, for example, of a radio or television contest.

Third, by down loading the destination number and then having the intelligent terminal in effect dial that number, the call can then be placed over the network using the Preselected Interexchange Carrier (PIC) of the calling party. This will be illustrated by an example: If the number 800-123-4567 is a number normally carried by MCI, and if the destination number is actually 212-987-6543, then, by dialing 1212-987-6543, the call be directed to the same destination, but over the facilities of the preferred carrier and not necessarily MCI. This allows a caller to obtain and take advantage of the unique capabilities that one carrier may have over the other, such as the True Voice (TM) capability available only from AT&T.

Fourth, by down loading the destination number to the intelligent terminal, the calling party has the opportunity to know the location of the person or service that they are calling. This capability is normally not available to the caller when conventional 800 call processing occurs in the network, since a person dialing a service center thought to be on the East Coast could easily turn out to be on the West Coast.

Referring now to FIG. 6, there is shown a block diagram illustrating the overall arrangement of another embodiment of the present invention, in which network intelligence in the form of routing information can be downloaded to a multiple mode intelligent terminal 601 so that subsequent calls originated from that terminal may be optimally routed over diverse types of networks. As shown in FIG. 6, intelligent terminal 601 is connected to several networks of diverse types, including a first wireline connection to a Local Exchange Carrier (LEC) network 605 and to an interconnected Interexchange Carrier (IXC) network 610 comprising switches 611-1, 611-2 and database 612, a second wireless connection to a cellular telephone network 615, and a third coaxial or fiber cable connection to a cable television (CATV) network 625. These multiple mode terminals represent an extension of dual mode terminals such as the Motorola Micro TAC (described in an article by Randy Oster and Gary Brush entitled "PCS: Hands-on Communications for All", Telephony Feb. 28, 1994, pages 31–42) that can originate and receive calls over LEC and cellular networks, and can be achieved simply by combining in one terminal the functionalities now available in several different terminal types. It is assumed that intelligent terminal 601 includes the components shown in FIG. 1, including a program memory that controls the operation of the terminal and a number translation memory that contains records associating a dialed number with routing instructions. Based upon instructions contained in the program memory, intelligent terminal 601 operates in a manner similar to that of terminal 101 of FIG. 1, as illustrated in FIG. 2; deviations from the process shown in that figure are explained below. Records contained in the number translation memory in terminal 601 are of the type illustrated in FIG. 7, discussed below.

When an intelligent network call is first originated from intelligent terminal 601, it may be assumed that there is no information in the number translation memory associating the dialed number to any stored routing information, and that the call is accordingly routed in accordance with default routing. For the purposes of description, default routing will be assumed to be from terminal 601 through LEC network 605 to switch 611-1 in IXC network 610. Because the call is recognized as an intelligent network call, a query is launched to a database 612, which returns routing information to switch 611-1 indicating how the call should be routed. In the embodiment of FIG. 6, the call can be routed, for example, to (a) LEC network 605 and then to a telephone 606, via a wireline connection, or (b) cellular network 615 and then to a wireless terminal 616 via a wireless connection, or (c) to CATV network 625 and then to a set top box 626 and its associated telephone 627 via a cable (coaxial or fiber or both) connection. The routing information retrieved from database 612 can also indicate a sequence in which calls are applied to each of the diverse networks shown in FIG. 6.

In accordance with the present invention, the routing information obtained from database 612 is transmitted to and stored in the number translation memory within intelligent terminal 601, in association with the dialed number. As a consequence, when the same dialed number is subsequently called, the number translation memory is consulted, and the routing information is retrieved. At this point, the call may be routed directly from terminal 601 to (a) LEC network 605 and/or IXC network 610, as a wireline call, (b) cellular network 615, as a wireless call, or (c) CATV network 625, as a CATV call. In addition, a sequence in which such networks are chosen in order to attempt call completion, may be specified.

By virtue of the arrangement just described, it will be seen that significant efficiencies are achieved. For example, a call from terminal 601 to wireless terminal 616 is made as a wireless only call, using only cellular network 615, without the need to use other networks. Similarly, a call from terminal 601 to telephone 627 is made as a CATV call, using only CATV network 625.

Referring now to FIG. 7, there is shown one illustrative format for the records contained in database 612 of FIG. 6, as well as within the number translation memory within intelligent terminal 601 of FIG. 6, once that memory has been populated with information downloaded from database 612. Each line contains information associated with a particular dialed number indicated in field 701. Field 702, 703 and 704 represent the priority ranking for each type of network to which a call to the number in field 701 can be routed, the networks being LEC network 605, cellular network 615, and CATV network 625, respectively. Thus, for example, calls to (908) 949-7503 are routed as a first choice via CATV network 625, as a second choice via LEC network 605 and as a third choice via cellular network 615. The sequence used for routing of calls placed to a different number is different. Note here that other information, such as the destination numbers associated with a particular dialed number, as applicable to routing via a particular network, will also be included in the record, as shown in FIGS. 4 and 5, unless there is a uniform dialing plan by which calls placed to a particular dialed number can be routed via diverse networks using the same number.

Persons skilled in the art will appreciate that various modification and adaptations may be made of the present invention. For example, although FIG. 1 depicts implementation of the present invention in the context of a local exchange carrier (LEC) network, the invention can also be implemented in an interexchange carrier (IXC) network. Also, although the invention has largely been described in the context of "500", "700", "800" or "900" number calls, it is to be understood that it may be practiced in connection with other "special" calls, such as those made to information service (e.g., 411), repair service (e.g. 611), and emergency service (e.g. 911). There are also network elements, commonly known as "adjuncts", which perform both a database and a switching function. Calls via these adjuncts are handled with database look ups, like an intelligent network call, but are not always accessed by easily identified codes such as "800" or "900" numbers. The techniques described in this application can also be used on calls placed via these adjuncts, and these calls are also thus to be considered a "intelligent network calls", even though they do not involve a dialed number with a "special service" type of NPA. Accordingly, the invention should be limited only by the appended claims.

What is claimed is:

1. A method for completing an intelligent network telephone call placed by dialing a dialed number from a terminal including a memory, comprising the steps of
   (a) determining if said memory in said terminal contains routing information corresponding to said dialed number,
   (b) (i) if so, providing said routing information to elements in the telephone network in order to complete said call, and
   (ii) if not,
      a. providing said dialed number to said elements in the telephone network in order to obtain routing information with which to complete said call, and
      b. storing said routing information in said memory in said terminal for use in completing subsequent calls to said dialed number.

2. The invention defined in claim 1 wherein said routing information is a destination number.

3. The invention defined in claim 1 wherein said routing information identifies a network to which said call should be routed.

4. The invention defined in claim 3 wherein said network is a wireline network, a cellular network or a CATV network.

5. The invention defined in claim 1 wherein the routing information stored in said memory includes a time stamp indicative of the date and/or time at which said information was stored, and said method further includes the step of removing information from said memory when said time stamp indicates that said routing information is older than a predetermined age.

6. A method of call completion for intelligent network telephone calls, comprising the steps of
   determining when a call requiring intelligent network treatment is first made from an intelligent terminal, if the terminal has the requisite routing information to complete the call;
   if the terminal does not have the requisite information needed to complete the call, querying network elements to determine routing information associated with the dialed number, and storing said routing information in said intelligent terminal;
   if the terminal does have the requisite routing information needed to complete the call, providing said routing information to said network elements.

7. The method defined in claim 6 wherein, prior to said storing step,
   a determination is made if (a) the calling party requested a down load, and (b) a database record associated with the dialed number indicates that routing information stored in the database is marked for down loading.

8. The method of claim 6 wherein said network elements include
   the originating switch handling said intelligent network telephone calls.

9. The method of claim 6 wherein said network elements include
   a network database.

10. An intelligent network system comprising an intelligent terminal including a memory for storing translations between dialed 800 telephone numbers and routing numbers that correspond to those dialed numbers;

means, responsive to dialing an 800 number, for collecting the digits of the dialed number and comparing said digits to the numbers in the memory;

an originating switch;

means for transmitting the dialed number to the originating switch if no match is found by said collecting and comparing means;

a service control point (SCP);

means for originating and routing a query message to said service control point (SCP);

means in said SCP for translating said 800 number to an appropriate routing number and for returning said routing number to said originating switch; and means in said originating switch for transmitting said routing number to said intelligent terminal for storage in said memory in association with said 800 number.

11. The system defined in claim 10 further including means for retrieving and transmitting the stored number to the originating switch if a match is found.

12. The system of claim 10 wherein said collecting and comparing means is arranged to compare said digits on a digit by digit basis.

13. Apparatus for completing calls via a communications network, said apparatus comprising a memory containing routing information associated with dialed numbers;

means responsive to a particular dialed number for determining if there is an entry in said memory containing said particular dialed number and its associated particular routing information; and means for (a) outputting to said communications network, said particular routing information stored in said memory, if an entry is present in said memory for said particular dialed number, and (b) (i) generating a query to an element in said communications network, said query including said particular dialed number, and (ii) storing the response to said query received from said element in said communications network, said response including the particular routing information associated with said particular dialed number, in said memory, if an entry is not present in said memory for said particular dialed number.

14. The invention defined in claim 13 wherein said apparatus further includes means for displaying the destination number associated with a dialed number.

15. The invention defined in claim 13 wherein said routing information is a destination number.

16. The invention defined in claim 13 wherein said routing information identifies a network to which a call should be routed.

17. The invention defined in claim 16 wherein said network is a wireline network, a cellular network or a CATV network.

18. A method for routing telephone calls originated from an intelligent terminal through a telephone network, said method comprising the steps of receiving a dialed telephone number as an input to said intelligent terminal;

determining if a destination number associated with said dialed telephone number is stored in said intelligent terminal;

if a destination number associated with said dialed telephone number is stored in said intelligent terminal, transmitting said destination number in lieu of said dialed telephone number, to elements in said telephone network;

if a destination number associated with said dialed telephone number is not stored in said intelligent terminal, routing a query containing said dialed telephone number to said elements in said telephone network, and, responsive thereto, receiving from said elements in said telephone network, a destination number associated with said dialed telephone number, and storing said destination number in said intelligent terminal.

19. The method of claim 18 wherein said determining step is performed only for selected dialed telephone numbers.

20. The method of claim 19 wherein said selected dialed telephone numbers are selected based upon the numbering plan area (NPA) portion of said numbers.

21. The method of claim 19 wherein said selected dialed telephone numbers are numbers for "800" telephone calls.

* * * * *